United States Patent [19]

Ohkawa et al.

[11] 3,974,497
[45] Aug. 10, 1976

[54] DISPLAY DEVICE

[75] Inventors: Kiyoto Ohkawa; Osamu Watanabe; Yoshiteru Nakamura, all of Kamakura, Japan

[73] Assignee: Mitsubishi Denki Kabushiki Kaisha, Japan

[22] Filed: Dec. 20, 1974

[21] Appl. No.: 535,124

[52] U.S. Cl. .............................. 340/337; 235/156; 340/172.5; 340/324 A
[51] Int. Cl.² .......................................... G06F 3/14
[58] Field of Search ......... 340/324 A, 324 AD, 337; 235/156

[56] References Cited
UNITED STATES PATENTS

| | | | |
|---|---|---|---|
| 2,769,592 | 11/1956 | Burkhart et al. | 235/156 |
| 3,375,356 | 3/1968 | Schitto et al. | 235/156 |
| 3,391,391 | 7/1968 | Simpson | 340/172.5 |
| 3,432,845 | 3/1969 | Douglas et al. | 340/324 A |
| 3,518,629 | 6/1970 | Frankel | 235/156 |
| 3,526,760 | 9/1970 | Ragen | 235/156 |

*Primary Examiner*—David L. Trafton
*Attorney, Agent, or Firm*—Oblon, Fisher, Spivak, McClelland & Maier

[57] ABSTRACT

The present invention relates to display devices used as terminal devices for an electronic computer or the like, and more particularly to digital displays in a specific display region on a display device having character display functions.

In digital display, read errors tend to occur if the digit places or decimal points on the display screen disagree with each other. The invention has solved this problem by the use of special codes designating on the display screen a region permitting the display of only digits and specific symbols attendant to digits. Therefore the display device of the invention is characterized in that when an input data appears in the designated digital region (or digital area), it is determined whether the input data is of a digit or of a specific symbol attendant to a digit. The date, when discriminated as a specific symbol, is written into the last significant digit place in the digital area causing the existing digit to be carried.

This display device is characterized also by its ability to coordinate decimal points on the display screen. The device of the invention is further characterized in that any digital input overflow can be detected according to the manner in which a carry is completed, i.e., whether a digit or a specific symbol attendant to a digit has been detected or a predetermined specific symbol, not a digit, has been detected.

5 Claims, 13 Drawing Figures

DISPLAY DEVICE

BACKGROUND OF THE INVENTION

1. Field of the Invention

The present invention relates to display devices of the type having character display functions wherein, for digital display, the digit place or decimal place is adjusted, and an input data overflow in a predetermined digital display region is detected.

2. Description of the Prior Art

In a display device, the disagreement between digit places or decimal points of a certain number of digits displayed in rows will require the operator to exert extra readout efforts or cause read error. (For explanatory simplicity, a character display device will essentially be considered hereinafter.)

Presently, digit place designation, decimal place designation, and overflow indication are displayed, for example, on an electronic calculator. The display available on an electronic calculator is only of digits or specific symbols, and such display appears in a predetermined position. Further, on an electronic calculator, the number of digits which can be displayed is limited. Whereas, in a character display device, a variety of digital displays can occur anywhere on the screen. This has made it difficult to designate a digit place or a decimal place and to detect overflow in a character display device. For more information on the prior art display, the outline of a character display device will be described below.

FIG. 1 is a block diagram showing an example of a character display device comprising an interface control part 1, a display control part 2, a cathode-ray tube (CRT) 3, and a keyboard 4. The interface control part 1 comprises a line interface part 8 and a message control part 9. The display control part 2 comprises a CRT controller 10, a refresh memory 11, a video circuit 12, and a timing circuit 13 for supplying a timing signal. The interface control part 1 controls data from or to a computer 6 by way of a communication line 5. Data from the computer 6 is received by the interface control part 1 in which the data is examined to determine to which character it belongs, the transmission control character or the display character. When it is a transmission control character, the data is processed in the interface control part 1. When it is a display character, the data is transferred to the display control part 2 in which the data is processed. The interface control part 1 sends the computer 6 data in given format comprised of the combination of transmission control data generated in the interface control part 1 and a display character supplied from the display control part 2 to the interface control part 1. In this manner, the interface control part 1 controls the data which it receives and transmits.

The display control part 2 controls the display of data on the screen of CRT 3, controls the data exchange between the interface control part 1 and the refresh memory 11, controls the interface with the keyboard 4, controls data editing, and controls traveler format.

This prior art character display device is operated in the following manner. When digits are supplied in sequence from the keyboard 4, a display will appear on the screen as shown in FIG. 2. In FIG. 2, reference numerals 21-1(a), 21-1(b), . . . , 21-m(n) represent display addresses on the screen, and reference numeral 22 represents a traveler. Assume the traveler 22 is present in the address 21-2(a). When the number of digits "123" is displayed on the screen by a data input device such as a keyboard, the traveler 22 advances one by one at each data input. Thus, at the end of the input, the traveler 22 is in the address 21-2(d). Assume the operator feeds "1234" to be displayed in the row beneath "123", and then "12345" to be displayed in the row beneath "1234", as shown in FIG. 2 wherein digit places differ by the individual numbers. A similar problem occurs with the display of a decimal point. In FIG. 3, the reference numerals 31-1(a), 31-1(b) . . . , 31-m(n) denote display addresses on the screen, and reference numeral 22 denotes traveler. Assume the traveler 22 is present in the address 31-1(a). When the operator generates an input data "12.3" for display on the screen by way of the keyboard, the traveler 22 advances one by one at each data input. At the end of the input, the traveler 22 is in the address 31-1(e). Further, assume the operator generates "123.45" and then "12.345" for display on the screen. As shown in FIG. 3, digit places and decimal places differ by the individual numbers. If digit places and decimal places are desired to be coordinated, the operator should determine the traveler position each time he generates an input digit. This has hampered the achievement of substantial man-machine interface capabilities of a character display device. Solutions to the prior art problems have long been awaited.

SUMMARY OF THE INVENTION

Therefore it is an object of the invention to provide a display device capable of operation free of the prior art drawbacks mentioned hereinbefore.

The foregoing and other objects are attained in accordance with one aspect of the present invention through the provision of a display device in which digit places and decimal points are coordinated for ease of view on the display screen, and input overflow is detected when digital data is in excess of the predetermined limit on the number of digits allowed for display. According to the invention, a special code is used to designate a region where digits and specific symbols attendant to digits are displayed. When input data is supplied to this region (i.e., digital area), it is determined whether the input data consists of digits or of specific symbols attendant to digits, numeral it is the specific symbol, the input data is written in the digital area, thereby causing the existing digit to be carried.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
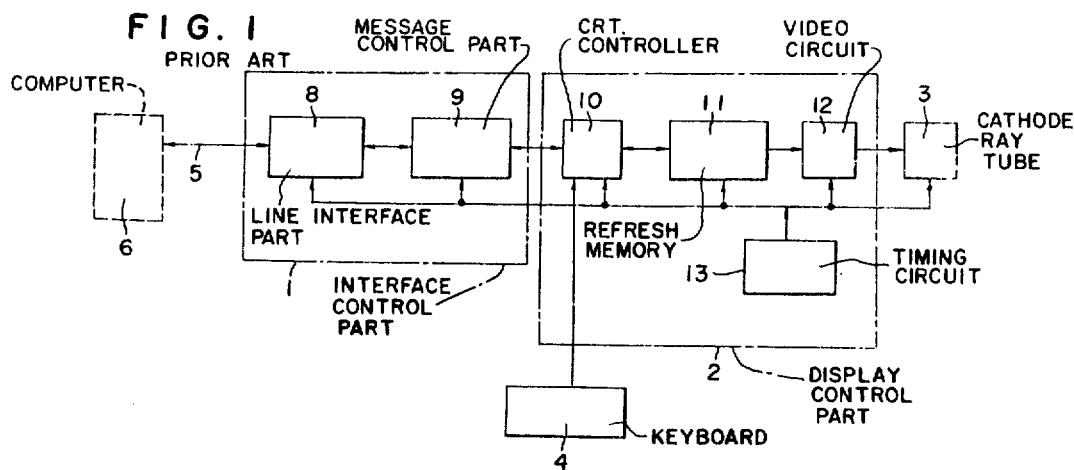
FIG. 1 is a block diagram showing the outline of a character display device.
Figure 2:
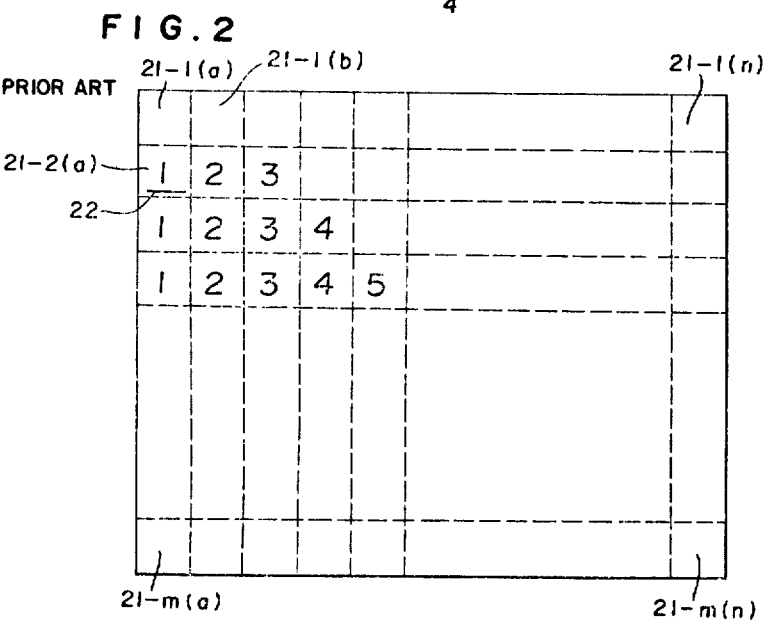
FIGS. 2 and 3 are diagrams showing display screens in conventional character display devices.
Figure 3:
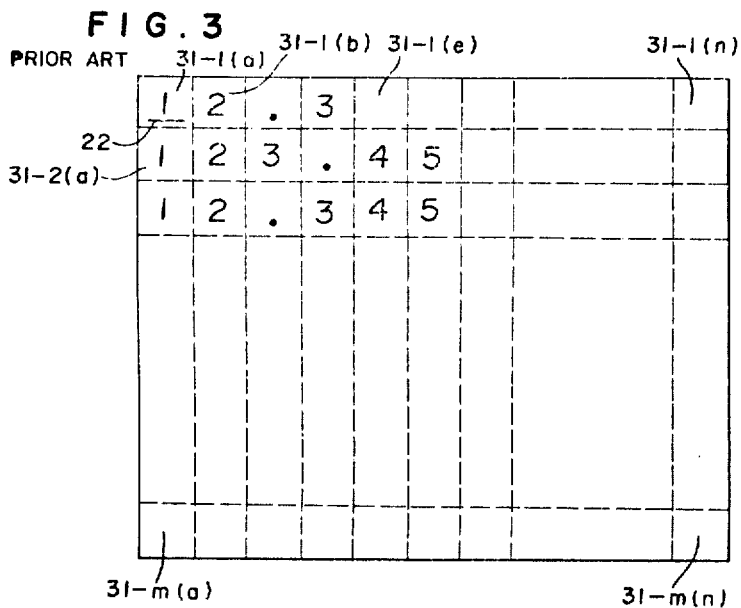
Figure 4:
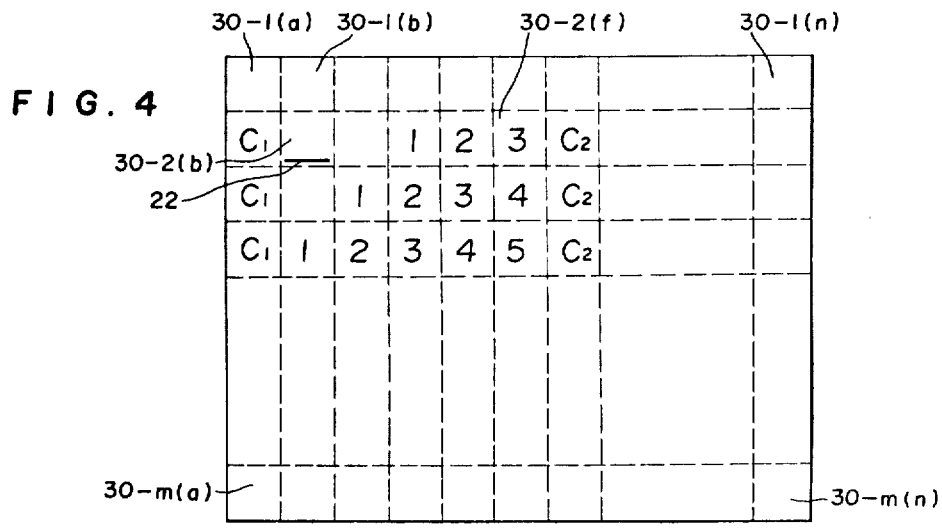
FIG. 4 is a diagram showing a display on the screen according to the invention.
Figure 5:
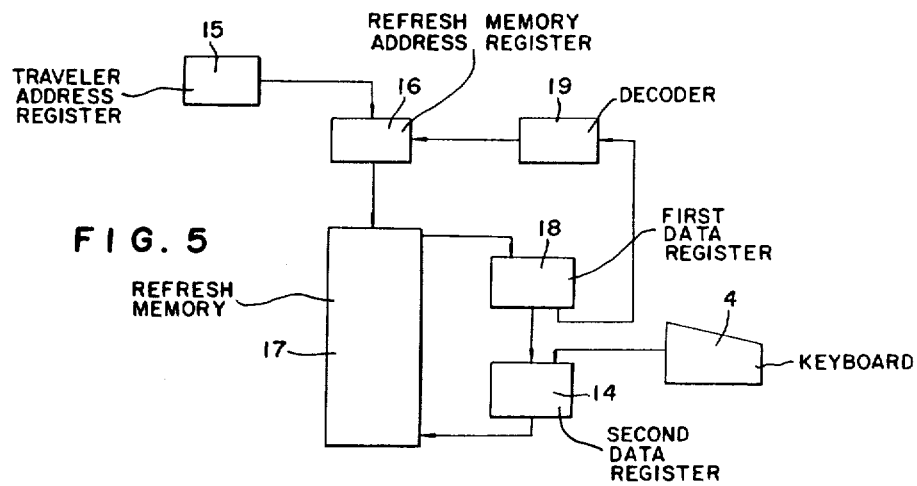
FIG. 5 is a block diagram showing an embodiment of the invention.

Referring now to the drawings, wherein like reference numerals designate identical or corresponding parts throughout the several views, and more particularly to FIG. 4 thereof, there is shown a diagram of a display on a screen where digit places are coordinated according to the invention. The references $C_1$ and $C_2$ represent control codes which are not always displayed on the screen. FIG. 5 is a block diagram showing a display device embodying the invention wherein the numeral 4 denotes a keyboard, 14 a second data register, 15 a traveler address register, 16 a refresh memory address register, 17 a refresh memory, 18 a first data register, and 19 a decoder.

Assume that a display as shown in FIG. 4 is obtained with the use of the display device illustrated in FIG. 5. In FIG. 4, the codes $C_1$ and $C_2$ indicate attributes of the display region; the code $C_1$ represents the start of the digital display region, and the code $C_2$ the end of the digital display region. Further assume that in the region between the codes $C_1$ and $C_2$, only digits and specific symbols (e.g., negative and positive signs) attendant to digits are displayed.

Figure 6:
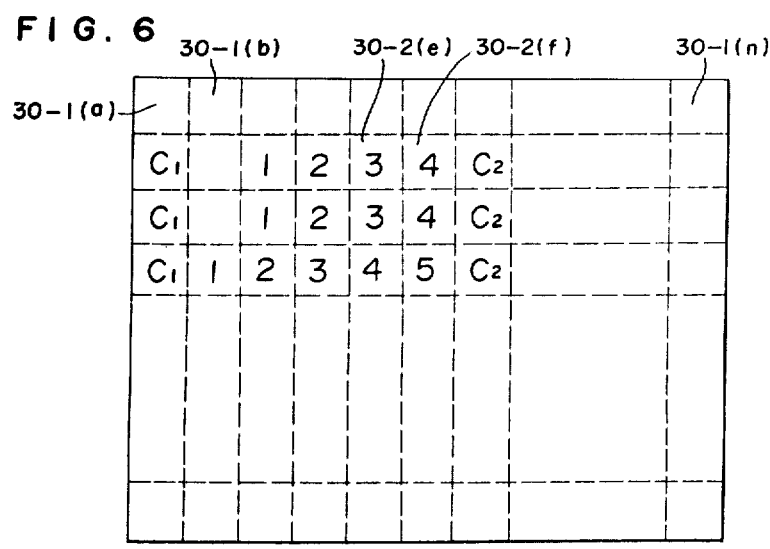
FIG. 6 is a diagram showing a display on a screen obtained according to the invention illustrated in FIG. 4.

When the operator shifts a traveler 22 to a display address 30-2(b) and generates an input data "4" from the keyboard 4, this data enters the second data register 14. At the same time, the data in the traveler address register 15 is transferred to the refresh memory address register 16. Then the data in the refresh memory 17 which is indicated by the refresh memory address register 16 is set into the first data register 18. The data in the first data register 18 is sent immediately to the decoder 19 in which it is determined whether the data in the address 30-2(b) is of $C_1$ or not. When it is not of $C_1$, the data in the memory address register 16 is counted down by one, and the data in the address 30-2(a) is set into the first data register 18. Then the data in the first data register 18 is sent to the decoder 19. A series of these operations are repeated until the code $C_1$ is encountered or as far as a specific refresh memory address, e.g., an address corresponding to the head of a row where the traveler 22 is present. When $C_1$ is encountered, the data in the traveler address register 15 is set into the refresh memory address register 16 again, and the data in this register 16 is counted up whereby the code $C_2$ is searched. When $C_2$ is encountered, the data in the register 16 is counted down by one, the data in the refresh memory 17 (i.e., the data in the display address 30-2(f) as in FIG. 4) is registered into the first data register 18, and the data in the second data register 14 is written in the address 30-2(f). Then the data in the first data register 18 is transferred to the second data register 14, the data in the memory address register 16 is counted down, and the data in the address 30-2(e) is set into the first data register 18. Then the data in the second data register 14 is written in the refresh memory 17 again. A series of these operations are performed until $C_1$ is set in the first data register 18 whereby a display as shown in FIG. 6 is obtained on the screen.

Another embodiment of the invention enabling decimal points to be coordinated will be described below.

Figure 7:
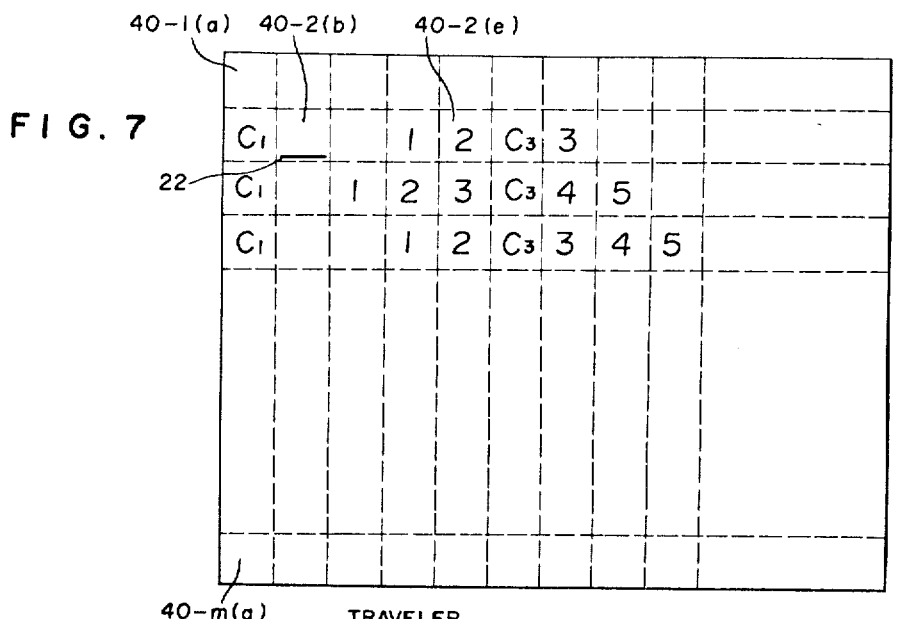
FIG. 7 is a diagram showing a display on a screen obtained according to the invention applied to the display shown in FIG. 3.
Figure 8:
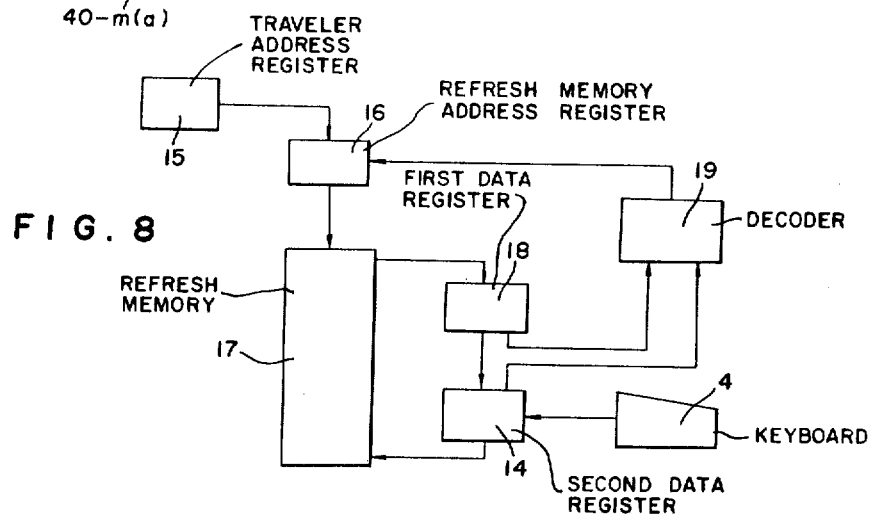
FIG. 8 is a block diagram showing another embodiment of the invention.

Referring to FIG. 7, there is shown a display where decimal points are coordinated. In FIG. 7, the references $C_1$ and $C_3$ represent control codes which are not always displayed on the screen. FIG. 8 is a block diagram showing another display device embodying the invention wherein, as in FIG. 5, the numeral 4 denotes a keyboard, 14 a second data register, 15 a traveler address register, 16 a refresh memory address register, 17 a refresh memory, 18 a first data register, and 19 a decoder.

Assume that a display on the screen as shown in FIG. 7 is obtained with the display device as in FIG. 8. In FIG. 7, the control code $C_1$ indicates the start of the digital display region, and the control code $C_3$ the place of a decimal point. The region between the codes $C_1$ and $C_3$ is for the integer part of the number, the position of $C_3$ is for a decimal point, and the regin to the right of $C_3$ is for the decimal part.

When the operator shifts the traveler 22 to the display address 40-2(b) and makes the entry of an input data "1", this digital data goes to the second data register 14 from the keyboard 4. At the same time, the decoder 19 ascertains that the data from the keyboard 4 is not of a decimal point but of a digit. Then the data in the traveler address register 15 is registered in the refresh memory address register 16, and the data in the refresh memory 17 which is indicated by the refresh memory address register 16 is set into the first data register 18. Operations following this step are for coordinating the decimal points in the manner described by referring to FIG. 4 and 5. Thus the invention makes a display available wherein the digit places are designated for the integer part of the input digits.

When an input data is found to be a decimal point by the decoder 19, the decimal is displayed at the address where the code $C_3$ is present, the data in the refresh memory address register 16 is set into the address next to the one where $C_3$ is present, and then the data from the keyboard 4 is written in the refresh memory 17 in the usual manner. Thus, according to the invention, decimal points and digit places can be designated for the individual rows on the digital area to permit the display of digits to be neatly coordinated on the screen as shown in FIG. 7.

Figure 9:
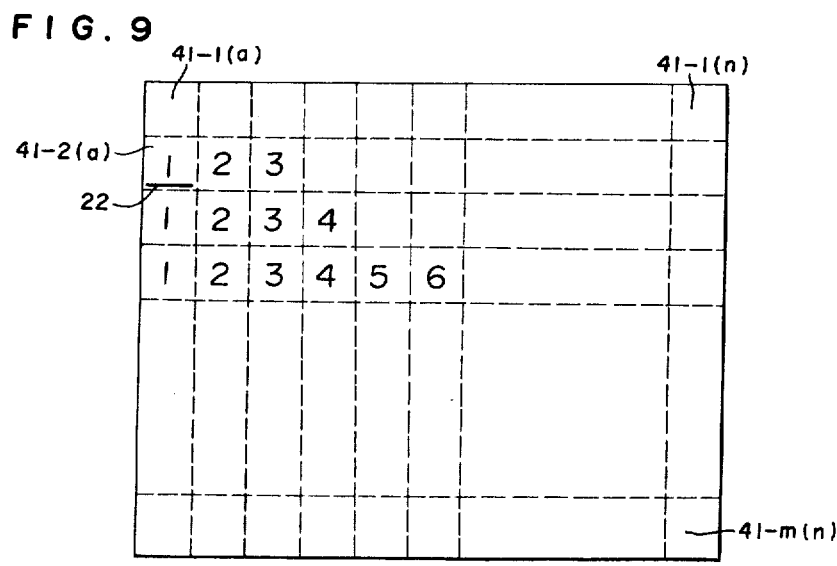
FIG. 9 is a diagram showing how an overflow is detected.

The capability of overflow detection available with the invention will be described hereinbelow. For the sake of illustration of this feature of the invention, the manner of display in a known character display device will be described by referring to FIG. 9. In FIG. 9, the references 41-1(a), . . . , 41-m(n) represent display addresses on the screen and the reference 22 represents a traveler.

Assume the traveler 22 is present in the display address 41-2(a). When the operator makes an input entry of digits "123" for display on the screen by way of a data input device such as a keyboard 4, the traveler 22 advances one by one at each entry of digit data. At the end of the input, the traveler 22 goes to the display address 41-2(d). Then, when the operator makes another input entry "1234" into the row beneath the first one, and a further input entry "123456" into the row beneath the second one is made, a display as shown in FIG. 9 is obtained on the screen. In this display, if the maximum number of input digit places is limited to five for each row, the last digit "6" should not appear on the screen. The invention has solved this problem in the manner described below.

Figure 10:
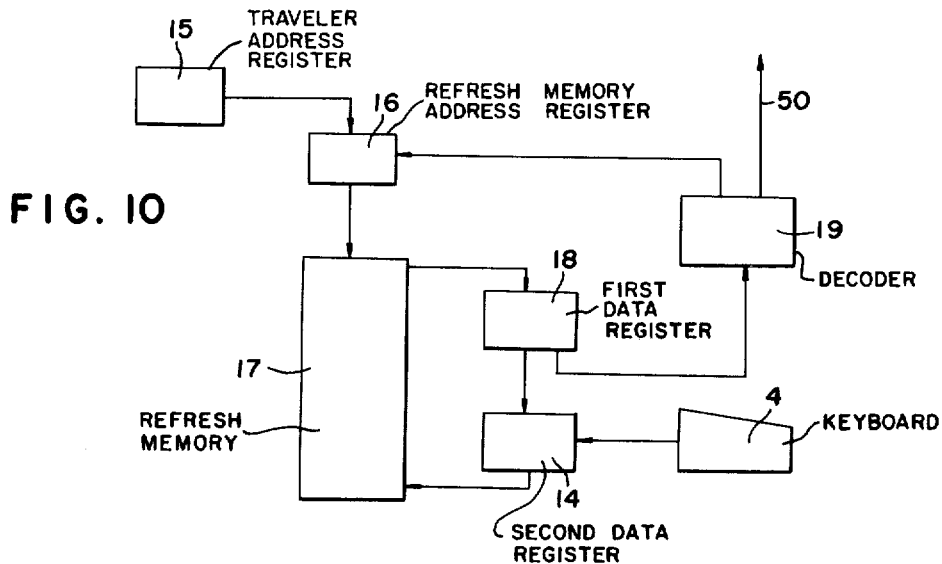
FIG. 10 is a block diagram showing another embodiment of the invention.

Referring to FIG. 10, there is shown a block diagram showing another embodiment of the invention useful for the detection of an overflow. As in FIG. 5, the reference numeral 4 denotes a keyboard, 14 a second data register, 15 a traveler address register, 16 a refresh memory address register (hereinafter referred to as a memory address register), 17 a refresh memory, 18 a first data register, 19 a decoder, and 50 an overflow detection signal.

Figure 11:
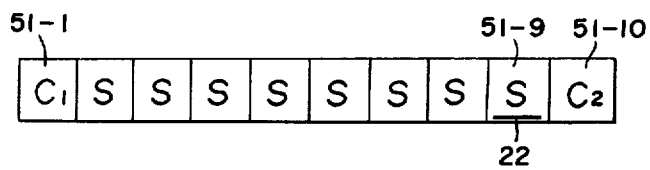
FIGS. 11 through 13 are diagrams useful for illustrating how an overflow is detected according to the invention.
Figure 12:
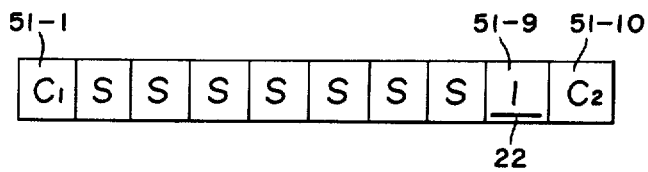
Figure 13:
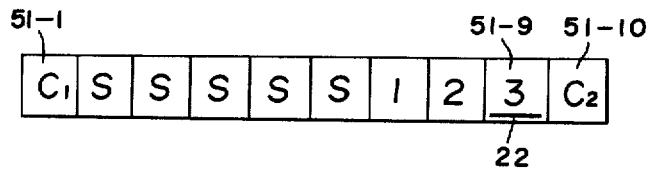

In connection with the operation of the device shown in FIG. 10, the modes of display are illustrated in FIGS. 11 through 13 wherein the reference numerals 51-1, 51-2, . . . , 51-10 denote display addresses. The references $C_1$ and $C_2$ are control codes used for the purpose of the invention and indicate the attributes of the display regions on the screen; the code $C_1$ indicates the start of the digital display region, and the code $C_2$ the end thereof. These codes are not necessarily displayed on the screen. For explanatory simplicity, assume that the maximum number of digits allowed as input data under the control of $C_1$ and $C_2$ is 8 places. Also assume that the positions of $C_1$ and $C_2$ in the digital display regions may be arbitrarily determined, and that a specific code S, not a digit, such as a space code, which has been determined according to system needs, is entered as an input into the region between $C_1$ and $C_2$ when these control codes are set.

When the operator shifts the traveler 22 to the address 51-1 where the code $C_1$ is present, it is known through the code $C_1$ the the traveler 22 is introduced into the digital display region. Therefore the traveler 22 is moved to the display address 51-9, i.e., the least significant digit place, the address being immediately before the address where the code $C_2$ is present. This state is shown in FIG. 11.

In this state, when an input digit "1" is received from the keyboard 4, this data enters the second data register 14. Then the data in the traveler address register 15 is transferred to the memory address register 16, and the data in the refresh memory 17 which is indicated by the memory address register 16 is read out to the first data register 18. The data in the first data register 18 is sent to the decoder 19 where it is determined whether the data read corresponds to $C_1$ or not. When the data is found not to correspond to code $C_1$, the data in the second data register 14 is written in the address indicated by the memory address register 16. After this write operation, the data in the first data register 18 is sent to the decoder 19 again where it is determined whether the data read from the refresh memory 17 is of the specific code S. At this stage, this data must be of the specific code S. Thus, when the code S is detected, a series of operations come to an end. The display obtained as a result of these operations is shown in FIG. 12. Under this state, the traveler 22 is not moved.

The overflow detecting operation will be described in more detail. Assume an input digit "4" is supplied to a display region shown in FIG. 13. Under this state, the data representing "4" enters the second data register 14, and the data in the traveler address register 15 (i.e., the data in the address 51-9) enters the memory address register 16. Then the data in the refresh memory 17 which is indicated by the memory address register 16, i.e., the data "3" in this example, is read out to the first data register 18 and sent to the decoder 19 where it is determined that this data is not of the code $C_1$. This signifies the fact that no overflow occurs in the digital display region. Therefore the data in the second data register 14 is written in the refresh memory 17. After the write operation, the data in the first data register 18 is examined by the decoder 19 to see whether the data is of the specific code S. At this stage, it is known that the data in the first data register 18 is not of the specific code S. This signifies the fact that the carry operation is not yet completed. Accordingly, the data in the first data register 18 is transferred to the second data register 14, the data in the memory address register 16 is counted down by one, and the carry operation is thereby effected. More specifically, the data indicated by the memory address register 16 is read out to the first data register 18, and the read data is checked by the decoder 19 to see whether the data is of $C_1$ or not. The fact that the data is not of $C_1$ signifies that no overflow occurs in the digital display region. Therefore the data in the second data register 14, i.e., the digit which has been carried, is written into the refresh memory 17. After the write operation, the data in the first data register 18 is checked to see whether it is of the specific code S or not. The fact that the data is not of the code S signifies that the carry operation is not completed. Accordingly, the data in the first data register 18 is transferred to the second data register 14, and the data in the memory address register 16 is counted down by one to make ready the operation causing the digit in the lower place to move up into the place prepared thereby. A series of these operations are repeated until the control code $C_1$ or the specific code S is detected. When either code is detected, the operation ends. When the operation ends with the code S detected, this indicates that the input digit does not overflow the digital display region. When the operation ends with the code $C_1$ detected, a series of input digits overflow the digital display region.

The signal indicating an overflow may be transmitted to a suitable module (not shown) whereby the operator is informed of misoperation. The signal may also be used to inhibit any excess input digit.

Thus, according to the invention, digit places and decimal points can be coordinated for input digits, and digital input overflow can be detected.

As disclosed in the embodiments, coordinated digit places and decimal points can easily be obtained by means of the traveler moved by the operator to the desired position in the digital display region when the operator makes a digital input entry into the digital display region.

In the foregoing embodiments, special control codes are not used to designate the digital display region. Instead, for example, a specific bit may be added to each of the display addresses to designate the digital display region.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A display device having character display functions comprising:
   means for designating a digit designating region on a display screen where only digits and specific symbols attendant to digits are displayed;
   means for designating by specific data the position of the least significant place of the digit to be displayed;
   a refresh memory for storing display data;
   an address register for designating a specific address in the refresh memory;
   a first data register for registering the data of an address designated by the address register;
   a second data register for temporarily storing an external input data and supplying such data to the refresh memory;
   means for discriminating whether or not the output from the first data register is of the specific data; and
   means for introducing an external input digit into the least significant digit place designated by the digital display region designating means, and, at the same time, carrying the existing digit.

2. A display device having character display functions, comprising:
   means for designating by specific codes a region on a display screen where digits are displayed;
   means for replacing a specific code, not a digit, previously supplied as an input to the digital display region with an input digit each time an input is supplied;
   means for determining whether the data stored in the digit designating region relates to a digit or is a specific code not related to a digit;
   means for introducing an input digit in the digital display region into the least significant digit place designated by the digital display region designating means and, at the same time, carrying the existing digit; and
   means for detecting digital input overflow according to whether the carry is completed as a result of detection of a digit or a specific code attendant to a digit or as a result of detection of a specific code not of a digit.

3. A display device as claimed in claim 1 wherein the designation of the digital display region is made by means of specific codes, a predetermined specific code not of a digit is buried in the digital display region, the specific code not of a digit is replaced with an input digit each time an external digital input is supplied, and digital input overflow is detected according to whether the carry is completed as a result of detection of a digit or a specific code attendant to a digit or as a result of detection of a specific code not of a digit.

4. A display device having character display functions comprising:
   means for designating a digital display region on a display screen where digits are displayed;
   means for designating decimal point places in the digital display region;
   means for storing the data displayed on the display screen;
   means for discriminating between display modes of a specific region on the display screen;
   means for judging the position of the digit display region in which an input digit is to be written;
   means for writing the integer part of the input digits into the least significant digit place in the integer part of the designated region, and, at the same time, carrying the existing integer part;
   means for writing an input decimal point into the place of the decimal point designated by the decimal point place designating means; and
   means for writing the decimal part into the decimal part of the region in succession from the most significant digit place designated by the decimal point place designating means and by the display mode discriminating means.

5. A display device having character display functions comprising:
   means for designating a region on a display screen in which only digits and specific symbols attendant to digits are displayed;
   means for designating by specific data the place of a decimal point in the digital display region;
   a refresh memory for storing display data;
   a address register for designating a specific address register of the refresh memory;
   a first data register for registering the data in the address designated by the address register;
   a second data register for temporarily storing external input data and supplying such date to the refresh memory;
   means for discriminating whether or not the output from the first data register is of the specific data and whether or not the external input data is of a decimal point;
   means for writing the integer part of the input digits into the least significant digit place in the integer part of the designated region, and, at the same time, carrying the existing integer part;
   means for writing an input decimal point into the place of the decimal point designated by the decimal point place designating means; and
   means for writing the decimal part into the decimal part of the region in succession from the most significant digit place designated by the decimal point place designating means.

* * * * *